United States Patent [19]

Sekizawa et al.

[11] Patent Number: 4,661,843

[45] Date of Patent: Apr. 28, 1987

[54] COLOR IMAGE COPYING APPARATUS

[75] Inventors: Hidekazu Sekizawa, Yokohama; Akito Iwamoto, Kamakura; Naofumi Yamamoto, Tokyo; Hitoshi Yoneda, Kawasaki, all of Japan

[73] Assignee: Kabushiki Kaisha Toshiba, Kawasaki, Japan

[21] Appl. No.: 753,260

[22] Filed: Jul. 9, 1985

[30] Foreign Application Priority Data

Jul. 16, 1984 [JP] Japan ............................... 59-146099
Sep. 29, 1984 [JP] Japan ............................... 59-204820

[51] Int. Cl.$^4$ ............................................. H04N 1/46
[52] U.S. Cl. .......................................... 358/80; 358/75
[58] Field of Search ..................................... 358/80, 75

[56] References Cited

U.S. PATENT DOCUMENTS

| 4,393,398 | 7/1983 | Horiguchi | 358/80 |
| 4,534,059 | 8/1985 | Yamada | 358/80 |
| 4,535,413 | 8/1985 | Shiota | 358/80 |
| 4,597,006 | 6/1986 | Orsburn | 358/80 |

Primary Examiner—Howard W. Britton
Attorney, Agent, or Firm—Oblon, Fisher, Spivak, McClelland & Maier

[57] ABSTRACT

A color copying apparatus includes a color image sensor, an image information signal processing unit, and a color printer. The apparatus converts the three color component signals from the color image sensor into a luminance signal component and color difference signal components. At least one of the luminance signal component and the color difference signal components is subject to a nonlinear conversion. For density conversion between an input image and an output image, the luminance signal component is subject to a nonlinear conversion in a nonlinear conversion circuit.

15 Claims, 15 Drawing Figures

COLOR IMAGE COPYING APPARATUS

BACKGROUND OF THE INVENTION

The present invention relates to a color image copying apparatus and, more particularly, to a color image copying apparatus using a color image sensor.

Conventional color copying apparata include a type using an electrophotography technique and another type using a color drum scanner.

The copying apparatus of the electrophotographic type encounters difficulty in copying an original or subject copy, bearing a high or low density picture, with a satisfactory picture quality. In this type of copying apparatus, exposure conditions for the original must be altered according to the density of the original. However, it is difficult to finely and uniformly adjust the exposure conditions for three primary color components of the color picture. For this reason, the hue of the copy is frequently different from that of the original.

In the copying apparatus using the color drum scanner, a picture signal is usually not separated into a luminance signal component and color difference signal components. To alter the state of a copy according to the density of the original, the three primary color components must be changed simultaneously. The change of each of the three primary color components is frequently accompanied with a change in the hue of the copied picture.

SUMMARY OF THE INVENTION

An object of the present invention is to provide a color copying apparatus which can copy an input color original with high picture quality.

Another object of the present invention is to provide a color copying apparatus in which color signals derived from a color image sensor for scanning a color subject copy are converted into luminance and color difference signal components, and means is provided for nonlinear-converting at least one of the luminance signal component and the color difference signal components.

A color image copying apparatus according to the present invention comprises a color image sensor for scanning an input original bearing a color picture thereon, an image information processing unit for processing an image information signal derived from the color image sensor, and a color printer for printing a color image corresponding to an input image in response to output signals from the image information processing unit. According to the present invention, the image information processing unit includes means responsive to the color image information signals from the image sensor for forming a luminance signal component and color difference signal components, and means for nonlinearly converting at least one of the luminance signal component and the color difference signal components.

The nonlinear conversion means includes density conversion means connected to receive the luminance signal component to differ the density of the printed color image from that of the input image.

The nonlinear conversion means includes means for nonlinear-converting the luminance signal component for an achromatic color portion in the picture substantially in a bi-level quantizing manner.

The nonlinear conversion means includes saturation conversion means connected to receive the color difference signal component to differ the saturation level of the copied color image from that of the input image.

DETAILED DESCRIPTION OF THE PREFERRED EMBODIMENTS

Figure 1:
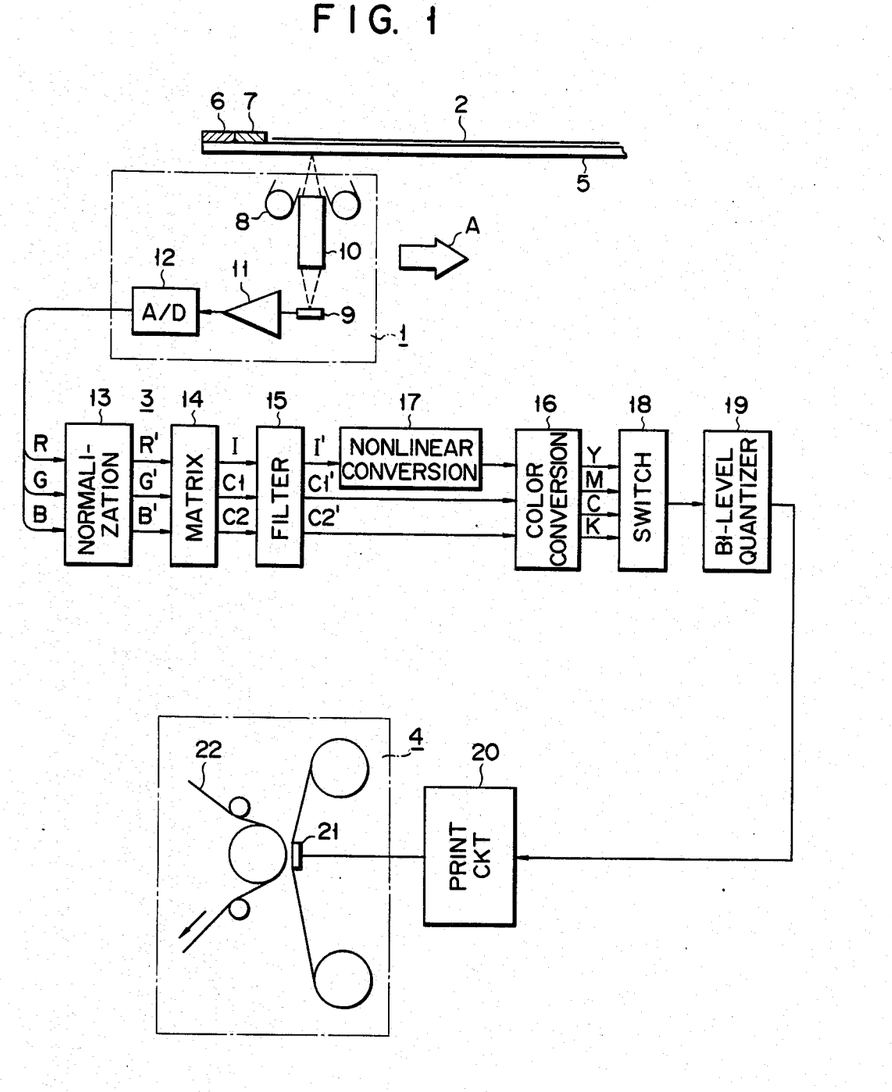
FIG. 1 schematically shows a color copying apparatus according to an embodiment of the present invention.

Referring to FIG. 1, a color copying apparatus embodying the present invention is shown which comprises a color scanner 1 for scanning a color original 2 to form color image information signals, an image information processing circuit 3 for processing image information signals, and a thermal color printer 4 for producing a hard copy of the color original in accordance with the processed color image information signals applied thereto.

The color original 2 is placed on a glass table 5, and scanned by the color scanner 1. For reading out the picture information of the original 2, the original 2 is scanned in two ways. The main scanning (line scanning) of the original is performed in the direction normal to the sheet and the sub-scanning is performed by moving the color scanner 1 in the direction of arrow A. Due to the main scanning and sub-scanning the picture information of one page original is read out. On one end portion of the glass table 5 except the area on which the original 2 is placed, a black reference plate 6 and a white reference plate 7 are disposed side by side in parallel with the main scanning direction. The black reference plate 6 and the white reference plate 7 are scanned by the color scanner 1, before the scanning of the original, to produce a black reference signal and a white reference signal, which are used for normalizing the image information signals.

The color scanner 1 comprises a linear light source 8, a CCD color line sensor 9, a distributed index rod lens array 10 (known by a trade name "SELFOC"), an amplifier 11, and an analog to digital (A/D) converter 12. The linear light source 8 is a fluorescent lamp, for example, for illuminating the original 2 and the reference plates 6 and 7 as well. The line sensor 9 senses light reflected from the illuminated original. The distributed index rod lens array 10 focuses the reflected light from the original on the line sensor 9. The amplifier 11 amplifies the picture signal output from the line sensor 9. The A/D converter 12 converts the amplified image information signals into digital signals.

The CCD color line sensor 9 is equipped with color filters of red (R), green (G) and blue (B) which are arranged in dot-sequential fashion, and produces picture signals of the primary color components corresponding to one scanning line on the original. The A/D converter 12 sequentially digitizes the color picture signals.

The R, G, B color picture signals from the color scanner 1 are serially applied to the picture signal processing circuit 3 and the picture signals are serially processed in the picture signal processing circuit. For ease of explanation, it is described such that the picture signal processing circuit processes the image information signals in a parallel fashion.

The R, G and B image information signals from the color scanner 1 are applied to a normalizing circuit 13. Before the color picture signals representing the original 2 are applied to the normalizing circuit 13, the black reference signal and the white reference signal are applied to the circuit 13. These reference signals are respectively representative of a black reference level and a white reference level as provided by the black reference plate 6 and the white reference plate 7. The normalizing circuit 13 sets parameters to normalize the respective color component signals representative of the original. Each color component signal is normalized to "0" for the white reference level and "1" for the black reference level.

The normalized R', G' and B' picture signals derived from the normalizing circuit 13 are applied to a matrix circuit 14 which produces a 6-bit luminance signal component I and 5-bit color difference signal components C1 and C2 according to predetermined matrix coefficients. The signal components are given by $$I = a_{11}R + a_{12}G + a_{13}B$$

$$C1 = a_{21}R + a_{22}G + a_{23}B$$

$$C2 = a_{31}R + a_{32}G + a_{33}B$$

The picture signals I, C1 and C2 are applied to a filter circuit 15. The luminance signal corresponding to edge portions in the picture where the image density abruptly changes, such as the edge portions of characters and lines, is filtered so as to intensify its high frequency components. The luminance signal corresponding to a half tone image is low-pass filtered to attenuate its high frequency components. The color difference signal components C1 and C2 are low-pass filtered.

The filtered signals I', C1' and C2' are supplied to a color conversion circuit 16, which produces 6-bit color printing signals which respectively represent printing ink colors, i.e. yellow (Y), magenta (M), cyan (C) and black (K), which are used in the color printer 4, and have magnitudes corresponding to amounts of the inks. The color conversion process is executed using the Neugebauer equation, the masking equation, or the like. The color conversion table may be constructed of a ROM containing a data table of previously calculated values of the color printing signals.

According to the present invention, the filtered luminance signal I' is input to a nonlinear conversion circuit 17 for density compensation, before it is input to the color conversion circuit 16. This will be described later in detail.

The color printing signals Y, M, C and K output from the color conversion circuit 16 are applied to a bi-level quantizing circuit 19, through a switch circuit 18. The switch circuit 18 sequentially selects one of these color printing signals in conformity with a corresponding one of color ink ribbons which are successively set in the printer 4. Specifically, the switch circuit 18 sequentially selects the color printing signals in the order of the setting of ink ribbons. The selected signals are applied to a printer circuit through the bi-level quantizing circuit 19. To record a half-tone image by the bi-level printing device, such as a thermal printer, the bi-level quantizing circuit 19 bi-level quantizes the color printing signals by a dithering technique. The printer circuit 20 drives a thermal head of the printer 4 to transfer ink from a color ink ribbon onto a recording paper 22. In this way, a color separation image is recorded on the recording paper.

The above image recording processing is performed in synchronism with the scanning of the original 2 on a real time basis. The four scannings of the original by the color scanner 1 and the four successive printings of the color separation images by four ink colors in the printer 4 reproduces one-page color copy of the original.

In the color image recording apparatus, the three primary color component signals of the color original 2 are produced almost simultaneously from the color scanner 1 every time the printer 4 performs a printing operation for each color. This reduces the influence upon the color printing signals by the change of the characteristics of the light source 8 and the color sensor 1, which may be caused during the four scanning operations of the original. Further, since the three color component signals are normalized by the black and white reference signals for each scanning of the original, the color printing signals can be provided with high accuracy. The real time processing of the image information signal eliminates the need for a large capacity memory for storing a picture information signal corresponding to one page of the original.

The nonlinear conversion of the luminance signal I' for density compensation will be described.

Figure 2:
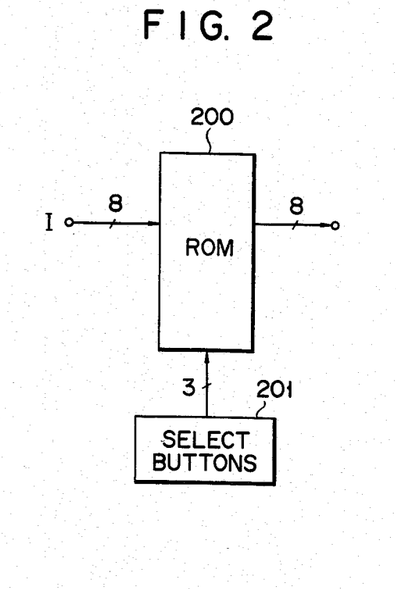
FIG. 2 shows an arrangement of a density conversion circuit as a nonlinear conversion circuit.
Figure 3:
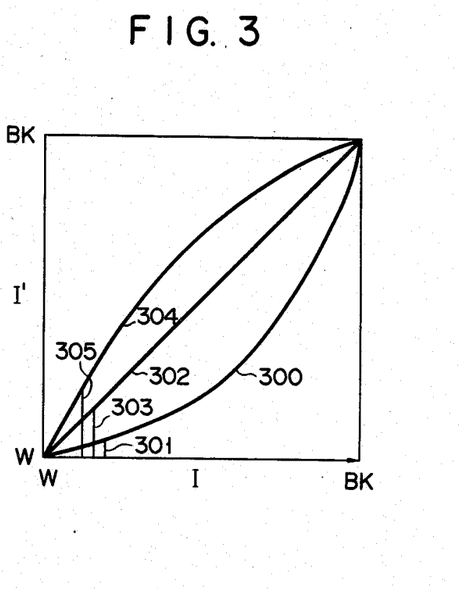
FIG. 3 shows density conversion characteristic of the density conversion circuit.

This nonlinear conversion is performed in order to copy a color original with high or low density with a high quality. The density compensation can also be used for correcting stains and discoloration of the original, viz. for the background compensation of the original. The nonlinear conversion circuit 17 may be constructed with a ROM 200, as shown in FIG. 2. In the ROM is previously stored a data table representing the density conversion characteristic, as shown in FIG. 3. In FIG. 3, a characteristic curve 300 is adapted for copying a very high density image at a lower density. A curve 302 is adapted for a normal density image. A curve 304 is adapted for copying a very low density image at a higher density. A select button 201 may be coupled with the ROM 200 for manually selecting a desired density characteristic according to the quality of the original. The density conversion circuit 17 may be constructed of a RAM. In this case, one of the density conversion data tables stored in a CPU is selectively loaded into the RAM by an operator. A memory capacity of the density conversion RAM may be small.

An empirically preferable density conversion characteristic (input vs. output characteristic of the ROM) is give by $$Iout = In^n$$

The characteristics 300, 302 and 304 correspond to n=1.5, n=1.0 and n=0.8, respectively.

The characteristic 301 is combined with the characteristic 300 to perform the background compensation. The characteristics 303 and 305 are combined with the characteristics 302 and 304 for the same purpose. In the background compensation the image density within a range from the white level to a predetermined level is recorded as white. In this embodiment, only the luminance signal is subject to the nonlinear conversion process for the density conversion. For this reason, the density conversion process is never accompanied with a change in hue.

Figure 4:
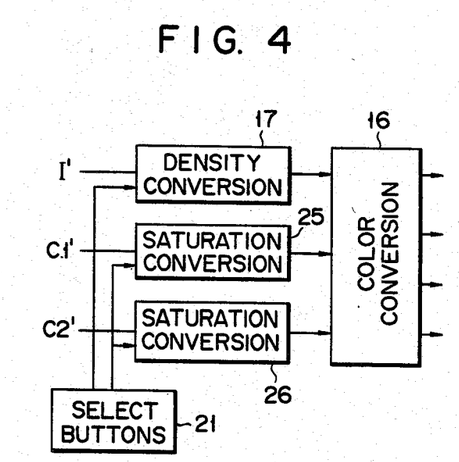
FIG. 4 shows an arrangement provided with a saturation conversion circuit for nonlinearly converting color difference signals.
Figure 5:
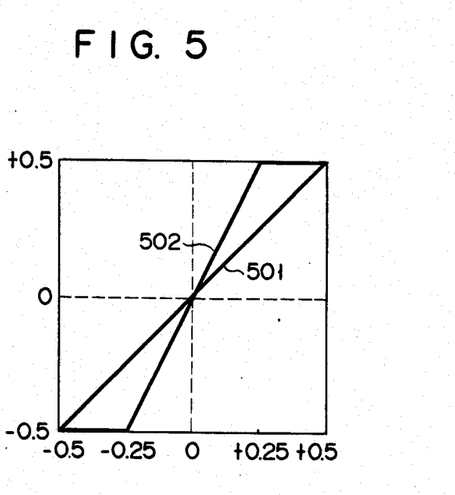
FIG. 5 shows conversion characteristics of the saturation conversion circuit of FIG. 4.

An embodiment of the present invention in which the color difference signals C1 and C2 as well as the luminance signal I are subjected to the nonlinear conversion, is illustrated in FIG. 4. This embodiment can correct an inappropriate exposure condition of an original such as a photograph. As shown in FIG. 4, nonlinear conversion circuits 25 and 26 for saturation correction, which are connected to receive the color difference signals C1 and C2, respectively, are inserted between the filter circuit 15 and the color conversion circuit 16. The nonlinear conversion circuits 25 and 26 may be ROMs which store data tables on nonlinear conversion characteristics as shown in FIG. 5. The characteristic 501 is linear and applied for ordinary images. The characteristic 502 is used for intensifying the color saturation of an original such as an over exposed photograph which is low in saturation. A desired characteristic can be selected by a button 201.

With the above-mentioned bi-level color printer, a half tone image of the color original can be effectively displayed. Due to the signal processing (dithering) for displaying the half tone images, character images of the input original may be blurred in an output picture. Most of characters are black in color, i.e. achromatic. The unclear display of the achromatic picture can be corrected by the nonlinear processing of the luminance signal. An embodiment of the present invention for the nonlinear processing of the achromatic image will be described.

Figure 6:
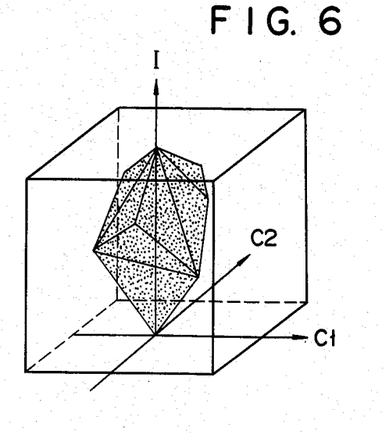
FIG. 6 shows a space in which a luminance signal and color difference signals exist.

The luminance signal I and the color difference signals C1 and C2, as formed by matrixing the color component signals derived from the color sensor 1, exist in a polygonal space as shown in FIG. 6. The general nature of a color original shows that achromatic portions, other than characters, are much smaller than the remaining portion of the original. Therefore, if an achromatic color portion is detected from the picture signal and the luminance signal for the achromatic color portion is intensified, the influence of intensifying the achromatic color portion on the entire picture would be negligible. On the basis of such consideration, with this embodiment, the luminance signal I representing the achromatic portion is subject to a nonlinear conversion substantially in a bi-level quantizing manner, according to a characteristic as indicated by 701 in FIG. 7. This embodiment is shown in FIG. 8.

Figure 7:
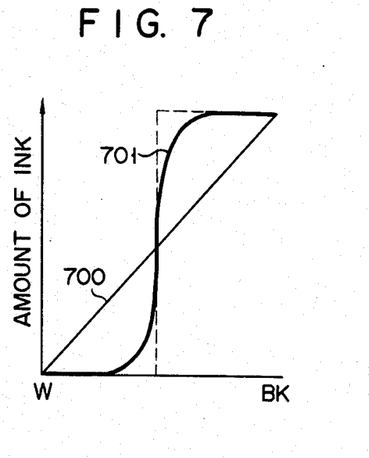
FIG. 7 shows a nonlinear conversion characteristic for intensifying the luminance signal for an achromatic color picture.
Figure 8:
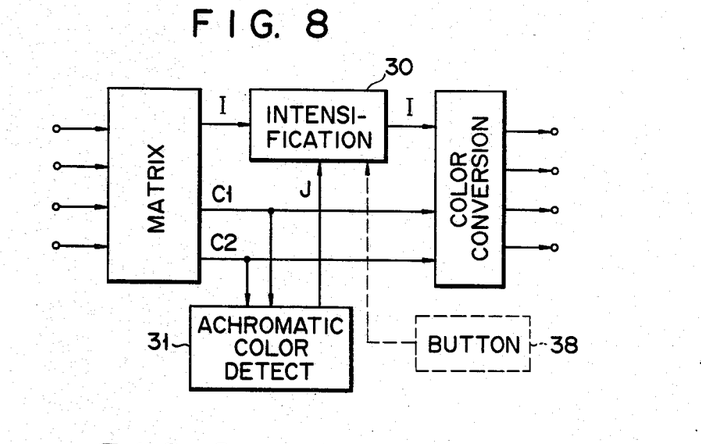
FIG. 8 shows an arrangement including a nonlinear conversion circuit for intensifying the luminance signal.
Figure 9:
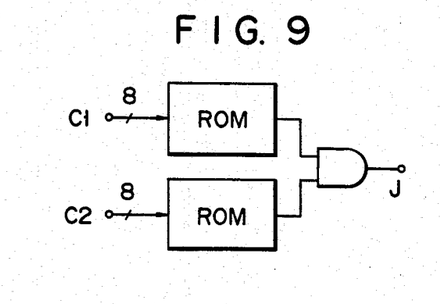
FIG. 9 shows an arrangement of an achromatic color image detecting circuit of FIG. 8.
Figure 10:
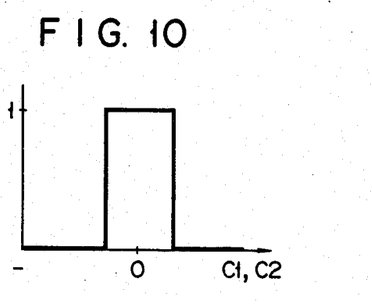
FIG. 10 shows an output characteristic of a ROM of FIG. 9.

A conversion circuit 30 with an input vs. output characteristic as shown in FIG. 7 is disposed between matrix circuit 14 and color conversion circuit 16. A detector circuit 31 is connected to receive the color difference signals C1 and C2 to detect an achromatic color image portion. The detector circuit 31, upon detecting the achromatic color portion, makes its output signal J high, which in turn switches the conversion circuit 30 from the characteristic 700 to the characteristic 701. The detector circuit 31 includes ROMs 32 and 33 connected to receive the color difference signals C1 and C2, respectively, and an AND gate 34 connected to outputs of the ROMs. Each of the ROMs 32 and 33, having an input vs. output characteristic as shown in FIG. 10, issues a signal of logical "1" when receiving an achromatic color input signal. With the presence of the logical "1" signals from the ROMs, the output signal J of the AND gate 34 goes high. If necessary, a button 38 may be provided for intentionally intensifying the luminance signal.

Figure 11:
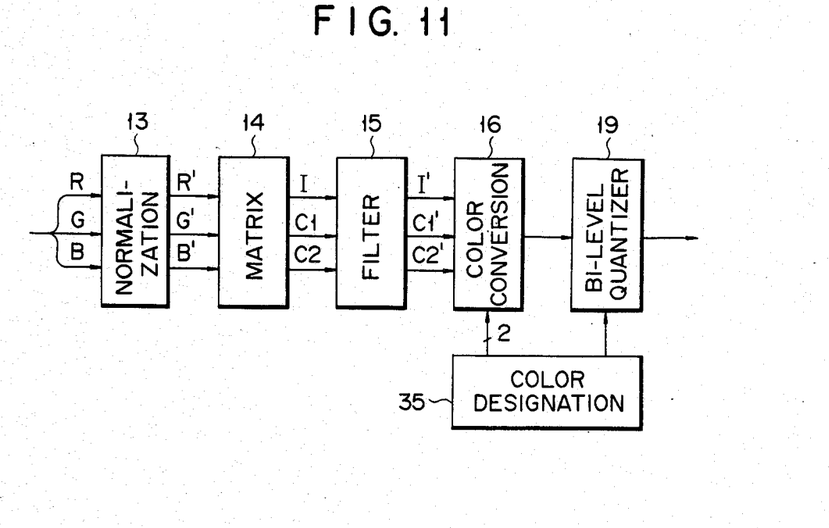
FIG. 11 shows an arrangement of a modification of the FIG. 1 embodiment which allows a switch circuit of FIG. 1 to be omitted.

The color conversion circuit 16 simultaneously produces the color printing signals Y, M, C, and K in the FIG. 1 embodiment. Alternatively, the color printing signals may be sequentially produced according to printing colors in the color printer 4 with the result that the switch circuit 18 can be excluded as shown in FIG. 11. In this case, a color designation circuit 35 should be provided to supply a color designation signal to the color conversion circuit 16, corresponding to a printing color in the printer. To exactly reproduce colors, it is desirable to alter dither patterns each for a color printing signal. To this end, the color designation signal is supplied to the bi-level quantitizing circuit 18 to change the dither patterns.

Figure 12:
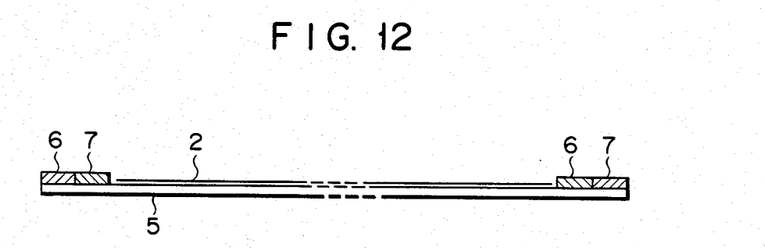
FIG. 12 shows an arrangement of black and white reference plates, which is different from that of FIG. 1.

In the FIG. 1 embodiment, the sub-scanning is performed only in the direction A for reading out the color picture information from the original 2. Therefore, for the next scanning, the scanner 1 must be returned to the original position. This is time consuming. This problem could be solved if, by using the reciprocal movement of the scanner 1, the original is bidirectionally scanned. In this case, each color component signal must be normalized by the black and white reference signals during the return of the scanner 1. To realize this, black and white reference plates 6 and 7 may be provided at both end portions of the glass table 5 as viewed in the sub-scanning direction, as shown in FIG. 12.

Figures 13, 14:
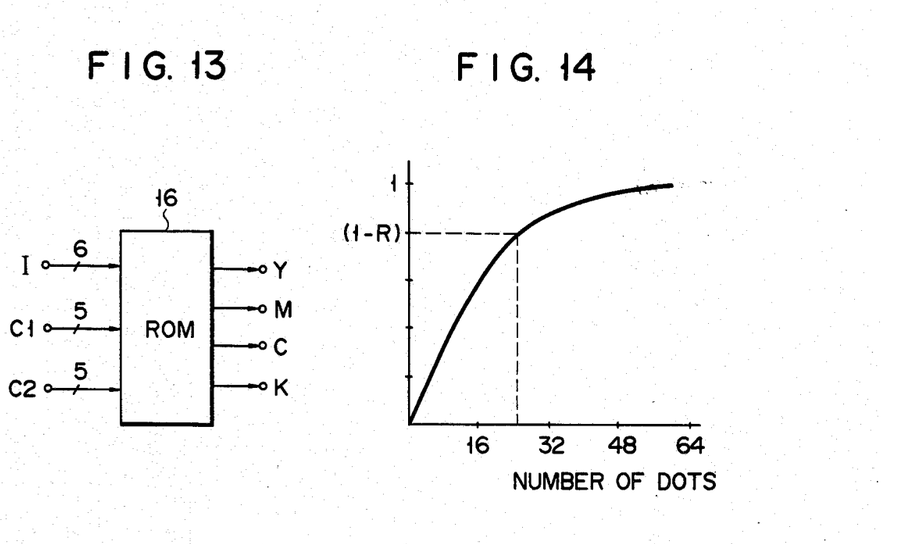
FIG. 13 shows an arrangement of a color conversion ROM suitable for color correction and graduation correction.
FIG. 14 shows an example of a graduation characteristic of a color printer.

In the embodiments of this invention as mentioned above, if the color conversion circuit 16 is adapted for gray scale compensation, allowing for an actual tonal recording characteristic of the printer 4, in addition to the color conversion, a color copy with good color reproduction can readily and effectively be obtained. To this end, the color conversion circuit 16 may be constituted by a ROM with an address space of 16 bits, as shown in FIG. 13. The luminance signal I of 6 bits and the color difference signals C1 and C2 each of 5 bits are used as address data, and each of the color printing signals Y, M, C and K is read out as a 6-bit signal representing one of 64 steps of gray scale. 194 K-bytes are sufficient for the capacity of the ROM. The color conversion ROM stores data representing an amount of color ink for each color printing signal as calculated by using the Neugebauer equation or the masking equation. These equations are set up assuming that the tonal characteristic of printer 4 is ideal. Therefore, the data table of the ROM should be obtained on the basis of a calculation taking the actual tonal characteristic of the printer into consideration.

FIG. 14 shows a tonal recording characteristic of the printer 4 for printing half tone images by dithering technique. As shown, in an 8×8 picture element array with a unit area, (1 - R) saturates as the number of printing dots increases. In the printer with such a tonal characteristic, the number of dots for each gray level can be obtained as f(R) where R indicates a reflectivity. The relationship of the number of dots to the gray level is used for correcting the data table as prepared using the equation constructed based on the ideal tonal characteristic of printer 4. In this way, both the color correction and the gray level correction can be performed simultaneously.

Figure 15:
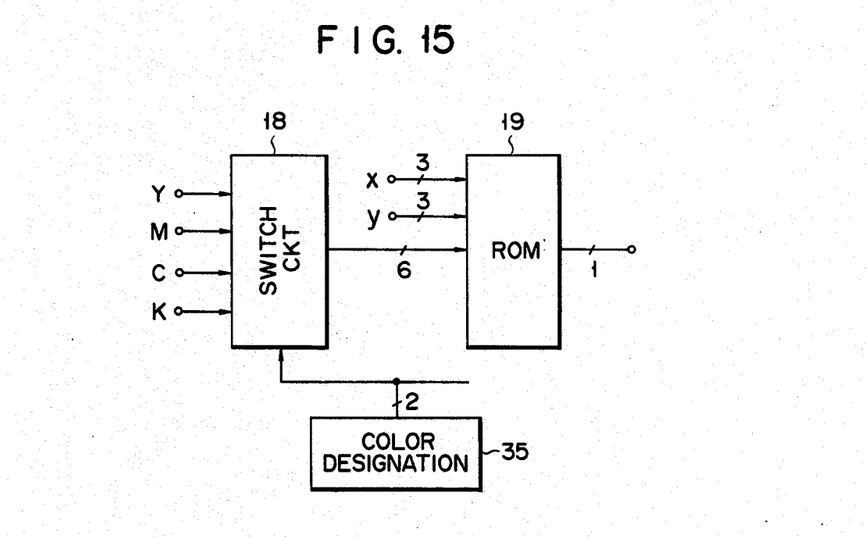
FIG. 15 shows an arrangement of a bi-level quantitizer.

FIG. 15 shows an arrangement of bi-level quantizing circuit for quantizing dot-number data according to the dithering technique. The bi-level quantizing circuit 19 may also be constructed by a ROM. The ROM stores four dithering patterns respectively corresponding to 8×8 pixel arrays for four ink colors used in the printer. Each threshold data in the dither pattern is specified by 3-bit address data x and y. The dither pattern for each ink color is selected by a color designation circuit 35. The color printing signals each representing the number of dots are applied from the switch circuit 18 to the bi-level quantizing circuit 19, where they are dithered. The 8×8 dither pattern matrix is scanned in the x and y directions by the address signals x and y during the color conversion circuit 16 applies one 6-bit signal to the bi-level quantitizing circuit 18. The address signals x and y are supplied by a scale-of-8 counter (not shown).

What is claimed is:

1. A color copying apparatus comprising:
    a color image sensor for optically scanning an input color image original to produce image informatinn signals representative of the color image original;
    a color printer responsive to color printing signals for printing a color image corresponding to the input color image original using a plurality of color inks;
    first circuit means connected to receive the image information signals from said color image sensor for producing a luminance signal component and color difference signal components;
    second circuit means coupled between said first circuit means and said printer for converting the luminance signal component and the color difference signal components into the color printing signals used in said color printer; and
    nonlinear conversion circuit means coupled between said first and second circuit means for converting, on a nonlinear basis, at least one of the luminance signal component and the color difference signal components.

2. A color copying apparatus according to claim 1, in which said nonlinear conversion means includes circuit means for converting the luminance signal component for an achromatic color image portion substantially in a bi-level quantizing manner.

3. A color copying apparatus according to claim 1, in which said color image sensor is arranged to produce substantially simultaneously three primary color signals of the input color image by scanning the input color image, said color printer is arranged to print a color output image corresponding to the color input image by superposedly recording color printing signals corresponding respectively to a plurality of ink colors used in printing, and said image information signal processing unit is arranged to produce, on a real time basis, one of the color printing signals from the three primary color signals from said color image sensor.

4. A color copying apparatus according to claim 1, in which said color image sensor produces a black reference signal and a white reference signal before the input color original is scanned by said color image sensor, and said reference signals are used for normalizing the three primary color signals from said color image sensor.

5. A color copying apparatus according to claim 4, in which a black reference plate and a white reference plate are provided, and said image sensor scans said black and white reference plates before scanning said original, thereby to form the black reference signal and the white reference signal.

6. A color copying apparatus according to claim 1, in which said nonlinear conversion means includes hue conversion means connected receive the color difference signal component for differing the hue of the printed color image from that of the input color image.

7. A color copying apparatus according to claim 6, in which said hue conversion means has a plurality of input vs. output characteristics which are externally selectable.

8. A color copying apparatus according to claim 7, in which said hue conversion means has an input vs. output characteristic for intensifying the hue of the input color image.

9. A color copying apparatus according to claim 1, in which said nonlinear conversion means includes density conversion means connected to receive the luminance signal component for differing the density of a printed color image from that of the input image.

10. A color copying apparatus according to claim 9, in which said density conversion means has an input vs. output characteristic given by $$Iout = Iin^n$$

wherein n is a positive number.

11. A color copying apparatus according to claim 10, in which said density conversion means has a plurality of input vs. output characteristics in which n substantially equals 1.5, 1.0, and 0.8, said input vs. output characteristics being externally selectable.

12. A color copying apparatus according to claim 10, in which the input vs. output characteristic of said density conversion means is combined with a characteristic for the background compensation of the input color image.

13. A color copying apparatus comprising:
    a color image sensor for optically scanning an input color image original to produce image information signals representative of the color image original;
    a color printer responsive to color printing signals for printing a color image corresponding to the input color image original using a plurality of color inks;
    first circuit means connected to receive the image information signals from said color image sensor for producing a luminance signal component and color difference signal components;
    second circuit means coupled between said first circuit means and said color printer for converting the luminance signal component and the color difference signal components into the color printing signals used in said color printer; and nonlinear conversion circuit means coupled between said first and second circuit means for converting, on a nonlinear basis, the luminance signal component to make a difference between the density of a printed color image and the density of the input color image original, said nonlinear conversion circuit means having a density conversion characteristic adapted for converting an input signal to an output signal on a nonlinear basis and a background compensation characteristic adapted for compensating for the background of the input color image original.

14. A color copying apparatus according to claim 13, wherein said nonlinear conversion circuit means comprises:

means for compensating for the background of the input color image original by converting the level of the input signal up to a predetermined level to a white level.

15. A color copying apparatus according to claim 13, in which said converting means contains a data table which is prepared allowing for a tonal recording characteristic of said color printer, whereby said conversion means produces the color printing signals which are compensated with respect to the tonal recording characteristic of said color printer.

* * * * *